United States Patent
Awahara et al.

(10) Patent No.: US 9,580,570 B2
(45) Date of Patent: Feb. 28, 2017

(54) RIGID POLYURETHANE RESIN FOR CUTTING WORK

(71) Applicant: SANYO CHEMICAL INDUSTRIES, LTD., Kyoto (JP)

(72) Inventors: Masaki Awahara, Kyoto (JP); Yusaku Mori, Kyoto (JP)

(73) Assignee: SANYO CHEMICAL INDUSTRIES, LTD., Kyoto (JP)

( * ) Notice: Subject to any disclaimer, the term of this patent is extended or adjusted under 35 U.S.C. 154(b) by 189 days.

(21) Appl. No.: 14/355,643

(22) PCT Filed: Nov. 13, 2012

(86) PCT No.: PCT/JP2012/079398
§ 371 (c)(1),
(2) Date: May 1, 2014

(87) PCT Pub. No.: WO2013/080787
PCT Pub. Date: Jun. 6, 2013

(65) Prior Publication Data
US 2014/0288198 A1    Sep. 25, 2014

(30) Foreign Application Priority Data

Nov. 30, 2011 (JP) ................................. 2011-261597

(51) Int. Cl.
| C08K 3/34 | (2006.01) |
|---|---|
| C08G 18/48 | (2006.01) |
| C08G 18/76 | (2006.01) |
| C08G 18/79 | (2006.01) |
| C08L 75/08 | (2006.01) |
| C08J 9/00 | (2006.01) |
| C08J 9/30 | (2006.01) |
| C08J 9/32 | (2006.01) |
| C08G 101/00 | (2006.01) |

(52) U.S. Cl.
CPC ............ *C08K 3/34* (2013.01); *C08G 18/4804* (2013.01); *C08G 18/4879* (2013.01); *C08G 18/7664* (2013.01); *C08G 18/797* (2013.01); *C08J 9/0066* (2013.01); *C08J 9/30* (2013.01); *C08J 9/32* (2013.01); *C08L 75/08* (2013.01); *C08G 2101/0025* (2013.01); *C08J 2201/022* (2013.01); *C08J 2205/044* (2013.01); *C08J 2205/10* (2013.01); *C08J 2375/04* (2013.01)

(58) Field of Classification Search
CPC ................................................. C08G 17/4879
See application file for complete search history.

(56) References Cited

U.S. PATENT DOCUMENTS

| 5,225,453 A | 7/1993 | Yamamori |
| 2006/0258762 A1* | 11/2006 | Dobransky ........ C08G 18/4018 521/131 |
| 2010/0261804 A1 | 10/2010 | Yamanaka et al. |

FOREIGN PATENT DOCUMENTS

| JP | 2-255819 | 10/1990 |
| JP | 6-329747 | 11/1994 |
| JP | 10-168152 | 6/1998 |
| JP | 10-339854 | 12/1998 |
| JP | 2004-115772 | 4/2004 |
| JP | 2006-249422 | 9/2006 |
| JP | 2007-291371 | 11/2007 |
| WO | 2009/060903 | 5/2009 |

OTHER PUBLICATIONS

English-language abstract and machine translation of the detailed description of JP 10-168152 to Block et al. obtained from the Japan Patent Office on Nov. 30, 2015.*
International Search Report issued Feb. 19, 2013 in International (PCT) Application No. PCT/JP2012/079398.

* cited by examiner

*Primary Examiner* — Melissa Rioja
(74) *Attorney, Agent, or Firm* — Wenderoth, Lind & Ponack, L.L.P.

(57) ABSTRACT

The present invention aims to provide a rigid polyurethane resin for cutting, which has high heat resistance, no scorching, and reduced expansion due to absorption of moisture in the air. The rigid polyurethane resin-forming composition (P) for cutting of the present invention includes: a polyol component (A); an isocyanate component (B); an inorganic filler (C); and a dehydrating agent (D). The polyol component (A) includes: 45 to 99% by weight of a polyphenol (j) alkylene oxide adduct (a), the polyphenol (j) having k functional groups where k is an integer of 2 or 3; and 1 to 55% by weight of a polyol (b). The polyphenol (j) alkylene oxide adduct (a) includes a total of not more than 39% by weight of a polyphenol (j) alkylene oxide adduct (ak) with at most k moles of alkylene oxide, based on 100% by weight of the polyphenol (j) alkylene oxide adduct (a), and has a hydroxyl value of 100 to 295 mg KOH/g. The polyol (b) is a multi-functional aliphatic or alicyclic polyol having 3 to 8 functional groups and has a hydroxyl value of 160 to 700 mg KOH/g. The weight of the oxyethylene groups included in the polyol component (A) is not more than 10% by weight in 100% by weight of the polyol component (A).

14 Claims, No Drawings

RIGID POLYURETHANE RESIN FOR CUTTING WORK

TECHNICAL FIELD

The present invention relates to a rigid polyurethane resin for cutting.

BACKGROUND ART

Conventional models and inspection jigs have been formed of materials such as natural wood, rigid polyurethane foams, and synthetic wood (e.g. foamed polyurethane molded articles produced by foaming a mixture of a bisphenol A alkylene oxide adduct, aliphatic polyol, aromatic polyisocyanate, and a dehydrating agent by a mechanical froth method) (see Patent Literature 1, for example).

CITATION LIST

Patent Literature

Patent Literature 1: JP H6-329747 A

SUMMARY OF INVENTION

Technical Problem

However, the synthetic wood disclosed in Patent Literature 1 fails to satisfy all of the following three properties: (1) heat resistance, (2) no scorching, and (3) slight dimensional increase due to absorption of moisture in the air, and not large dimensional increase even in summer with especially high humidities or in hot and humid regions. Thus, the conventional materials for models and inspection jigs still have room for improvement.

Thus, the present invention aims to provide a rigid polyurethane resin for cutting and a rigid polyurethane foam resin for cutting, both of which have high heat resistance, do not scorch, and have reduced expansion due to absorption of moisture in the air.

Solution to Problem

The present inventors conducted intensive studies to achieve the above aim and thus completed the invention. The invention relates to:

a rigid polyurethane resin-forming composition (P) for cutting;

a rigid polyurethane resin (Q) for cutting obtainable by a reaction of (P);

a rigid polyurethane resin molded article formed form the (Q);

a model, a master model, and an inspection jig, formed by cutting the (R); and a method for producing a rigid polyurethane resin (Q) for cutting, including reacting the (P) by a mechanical froth method.

The composition (P) includes:
a polyol component (A);
an isocyanate component (B);
an inorganic filler (C); and
a dehydrating agent (D), the polyol component (A) including: 45 to 99% by weight of a polyphenol (j) alkylene oxide adduct (a), the polyphenol (j) having k functional groups where k is an integer of 2 or 3; and 1 to 55% by weight of a polyol (b), the polyphenol (j) alkylene oxide adduct (a) including a total of not more than 39% by weight of a polyphenol (j) alkylene oxide adduct (ak) with at most k moles of alkylene oxide, based on 100% by weight of the polyphenol (j) alkylene oxide adduct (a), and having a hydroxyl value of 100 to 295 mg KOH/g, the polyol (b) being a multi-functional aliphatic or alicyclic polyol having 3 to 8 functional groups, and having a hydroxyl value of 160 to 700 mg KOH/g, the weight of oxyethylene groups included in the polyol component (A) being not more than 10% by weight in 100% by weight of the polyol component (A).

Advantageous Effects of Invention

The rigid polyurethane resin-forming composition of the present invention provides a rigid polyurethane resin for cutting and a rigid polyurethane foam resin for cutting, both of which have high heat resistance, do not scorch, and have reduced expansion due to absorption of moisture in the air.

DESCRIPTION OF EMBODIMENTS

The rigid polyurethane resin-forming composition (P) for cutting of the present invention includes a polyol component (A), an isocyanate component (B), an inorganic filler (C), and a dehydrating agent (D).

Polyol Component (A)

The polyol component (A) includes a polyphenol (j) alkylene oxide adduct (a), the polyphenol (j) having k functional groups where k is an integer of 2 or 3; and a polyol (b). The polyphenol (j) alkylene oxide adduct (a) includes a total of not more than 39% by weight of a polyphenol (j) alkylene oxide adduct (ak) with at most k moles of alkylene oxide, based on 100% by weight of the polyphenol (j) alkylene oxide adduct (a), and has a hydroxyl value of 100 to 295 mg KOH/g. The polyol (b) is a multi-functional aliphatic or alicyclic polyol having 3 to 8 functional groups and has a hydroxyl value of 160 to 700 mg KOH/g.

The hydroxyl value of the polyphenol (j) alkylene oxide adduct (a) is 100 to 295 mg KOH/g. The lower limit thereof is preferably 150 mg KOH/g, and more preferably 200 mg KOH/g. The upper limit thereof is preferably 290 mg KOH/g, and more preferably 285 mg KOH/g. A hydroxyl value less than 100 mg KOH/g reduces the heat resistance and promotes expansion due to moisture absorption of the resulting rigid polyurethane resin molded article. A hydroxyl value more than 295 mg KOH/g causes scorching.

Examples of the polyphenol (j) having k functional groups where k is an integer of 2 or 3 include $C_{6-20}$ dihydric phenols if k is 2; and $C_6$ polyhydric phenols if k is 3.

If k is 2, examples of the polyphenol (j) include bisphenols (j1) represented by the formula (2) [e.g. bisphenol F (Y is —$CH_2$—), bisphenol A (Y is —$C(CH_3)_2$—), bisphenol E (Y is —$CH(CH_3)$—), bisphenol S (Y is —$SO_2$—), 4,4'-dihydroxy diphenyl ether (Y is —O—), 4,4'-biphenol (Y is a direct bond)]; monocyclic dihydric phenols (j2) represented by the formula (3) (e.g. hydroquinone, catechol, resorcinol); and condensed polycyclic dihydric phenols (j3) represented by the formula (4) or (5) [e.g. dihydroxynaphthalene (1,5-dihydroxynaphthalene, 1,4-dihydroxynaphthalene)].

[Chem. 1]

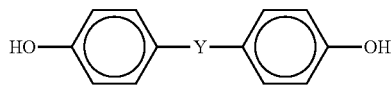

(2)

In the formula, —Y— represents any one group selected from —CH$_2$—, —C(CH$_3$)$_2$—, —CH(CH$_3$)—, —SO$_2$—, —O—, and a direct bond.

[Chem. 2]

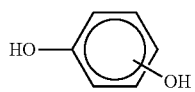

(3)

[Chem. 3]

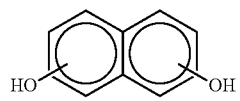

(4)

[Chem. 4]

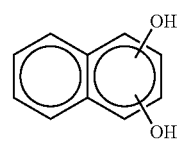

(5)

If k is 3, examples of the polyphenol (j) include monocyclic polyhydric phenols (e.g. pyrogallol, phloroglucinol).

Preferred among these are phenols in which k is 2, and more preferred is bisphenol A (hereinafter, referred to as BPA).

Examples of the alkylene oxide (hereinafter, referred to as AO) include C$_{2-4}$ AOs, specifically propylene oxide (hereinafter, referred to as PO), ethylene oxide (hereinafter, referred to as EO), butylene oxide, and mixtures thereof. Preferred among these are POs and mixtures of PP and EO.

If k is 2, examples of the polyphenol (j) AO adduct (a) include a bisphenol (j1) AO adduct (a1) represented by the formula (1), a monocyclic dihydric phenol (j2) AO adduct (a2) represented by the formula (6), and a condensed polycyclic dihydric phenol (j3) AO adduct (a3) represented by the formula (7) or (8).

[Chem. 5]

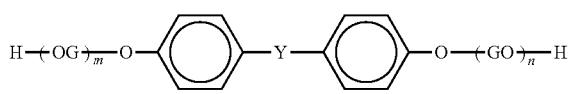

(1)

In the formula, —Y— represents any one group selected from —CH$_2$—, —C(CH$_3$)$_2$—, —CH(CH$_3$)—, —SO$_2$—, —O—, and a direct bond. G represents a C$_{2-4}$ alkylene group; and m and n are integers and m+n equals 1 to 13.

[Chem. 6]

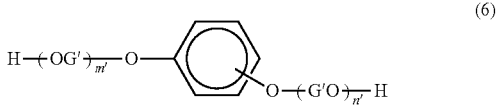

(6)

In the formula, G' represents a C$_{2-4}$ alkylene group; and m' and n' are integers and m'+n' equals 1 to 13.

[Chem. 7]

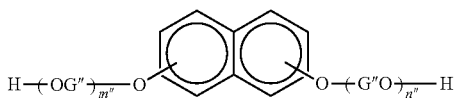

(7)

In the formula, G" represents a C$_{2-4}$ alkylene group; and m" and n" are integers and m"+n" equals 1 to 13.

[Chem. 8]

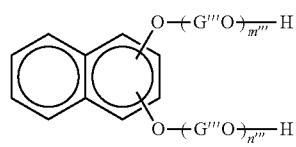

(8)

In the formula, G''' represents a C$_{2-4}$ alkylene group; and m''' and n''' are integers and m'''+n''' equals 1 to 13.

If k is 3, examples of the polyphenol (j) AO adduct (a) include a monocyclic polyhydric phenol AO adduct.

Preferred among these are those in which k is 2, more preferred is a bisphenol A (BPA) AO adduct, and particularly preferred is a bisphenol A PO adduct.

The polyphenol (j) AO adduct (a) includes a polyphenol (j) alkylene oxide adduct (ak) with at most k moles of alkylene oxide, the polyphenol (j) having k functional groups, in a total amount of not more than 39% by weight, preferably not more than 35% by weight, and more preferably not more than 30% by weight, based on 100% by weight of the polyphenol (j) AO adduct (a). A total amount of the polyphenol (j) alkylene oxide adduct (ak) more than 39% by weight causes the resulting rigid polyurethane resin molded article to scorch.

If the polyphenol (j) AO adduct (a) is a BPA PO adduct, the total amount of the polyphenol (j) alkylene oxide adduct (ak), which means a total amount of the mixture of a BPA PO (2 mol) adduct, a BPA PO (1 mol) adduct, and BPA, is not more than 39% by weight in 100% by weight of the polyphenol (j) AO adduct (a).

The proportion of the polyphenol (j) AO adduct (a) based on the weight of the polyol component (A) is 45 to 99% by weight, preferably 50 to 90% by weight, and particularly preferably 55 to 85% by weight, in terms of expansion of the resulting rigid polyurethane resin molded article due to moisture absorption. A proportion thereof less than 45% by weight promotes expansion of the resulting rigid polyurethane resin molded article due to moisture absorption. A proportion thereof more than 99% by weight causes the resin to be molten during cutting.

The multi-functional aliphatic or alicyclic polyol (b) having 3 to 8 functional groups has a hydroxyl value of 160 to 700 mg KOH/g. The lower limit of the hydroxyl value is preferably 250 mg KOH/g, and more preferably 300 mg KOH/g. The upper limit thereof is preferably 600 mg KOH/g, and more preferably 500 mg KOH/g. A hydroxyl value less than 160 mg KOH/g promotes expansion of the resulting rigid polyurethane resin molded article due to moisture absorption. A hydroxyl value more than 700 mg KOH/g causes the resin to scorch due to heat during molding.

The multi-functional aliphatic or alicyclic polyol (b) having 3 to 8 functional groups is an AO adduct of the multi-functional aliphatic or alicyclic alcohol. Examples of the multi-functional aliphatic alcohol are listed below.

In the following, C represents carbon.

(1) $C_{3-20}$ trivalent alcohols (glycerin, trimethylolpropane; trimethylolethane, aliphatic triols such as hexanetriol; trialkanol amines such as triethanolamine)

(2) $C_{5-20}$ tetravalent or higher polyvalent alcohols (aliphatic polyols such as pentaerythritol, sorbitol, mannitol, sorbitan, diglycerin, and dipentaerythritol; intramolecular or intermolecular dehydration product of these; and sugars such as sucrose, glucose, mannose, fructose, and methylglucoside, and derivatives of these).

Examples of the multi-functional alicyclic polyol are listed below.

(1) $C_{6-20}$ trivalent alcohols (alicyclic triols such as cyclohexanetriol)

(2) $C_{6-20}$ tetravalent or higher polyvalent alcohols (alicyclic tetraols such as cyclohexanetetraol)

Examples of the AO include $C_{2-4}$ alkylene oxides, specifically PO, EO, butylene oxide, and mixtures of these. Preferred among these is PO.

Preferred examples of the (b) are multi-functional aliphatic polyols, specifically PO adducts of glycerin, trimethylolpropane, pentaerythritol, sorbitol, and sucrose (addition mol number: 2 to 25).

The proportion of the (b) based on the weight of the polyol component (A) is 1 to 55% by weight, preferably 10 to 50% by weight, and particularly preferably 15 to 45% by weight, in terms of expansion of the resulting rigid polyurethane resin molded article due to moisture absorption. A proportion thereof less than 1% by weight causes the resin to be molten during cutting. A proportion thereof more than 55% by weight promotes expansion of the resulting rigid polyurethane resin molded article due to moisture absorption.

The amount of oxyethylene groups in the (A) is not more than 10% by weight, preferably not more than 5% by weight, and more preferably not more than 3% by weight, in 100% by weight of the (A). More than 10% by weight of oxyethylene groups in 100% by weight of the (A) promotes expansion of the resulting rigid polyurethane resin molded article due to moisture absorption.

In the present invention, the polyol component (A) may include a low-molecular-weight polyol [e.g. low molecular active hydrogen-containing compounds having a molecular weight of not more than 400, such as $C_{3-20}$ divalent alcohols {e.g. $C_{2-12}$ aliphatic divalent alcohols [(di)alkyleneglycols such as ethylene glycol, diethylene glycol, propyleneglycol, dipropyleneglycol, 1,2-, 2,3-, 1,3-, and 1,4-butanediols, 1,6-hexanediol, neopentylglycol, 3-methylpentanediol, dodecanediol], $C_{6-10}$ alicyclic divalent alcohols [e.g. 1,4-cyclohexanediol, cyclohexanedimethanol], $C_{8-20}$ aromatic-aliphatic divalent alcohols [e.g. xylylene glycol, bis(hydroxyethyl)benzene]}] as an active hydrogen component.

Isocyanate Component (B)

Examples of the isocyanate component (B) of the present invention include aromatic polyisocyanates, aliphatic polyisocyanates, alicyclic polyisocyanates, aromatic-aliphatic polyisocyanates, and modified products of these polyisocyanates.

Examples of the aromatic polyisocyanates include $C_{6-63}$ (except for C in NCO groups, the same shall apply hereinafter) aromatic polyisocyanates, such as diisocyanates [1,3- and/or 1,4-phenylene diisocyanate, 2,4- and/or 2,6-tolylene diisocyanate (TDI), 4,4'- and/or 2,4'-diphenylmethane diisocyanate (MDI), m- and/or p-isocyanatophenylsulfonyl isocyanate, 4,4'-diisocyanato biphenyl, 3,3'-dimethyl-4,4'-diisocyanato biphenyl, 3,3'-dimethyl-4,4'-diisocyanatodiphenyl methane, and 1,5-naphthylene diisocyanate]; and polyisocyanates having three or more functional groups (e.g. triisocyanate) [e.g. crude TDI, crude MDI (polymethylene polyphenyl polyisocyanate)].

Examples of the aliphatic polyisocyanates include $C_{2-18}$ aliphatic polyisocyanates, such as diisocyanates [ethylene diisocyanate, tetramethylene diisocyanate, hexamethylene diisocyanate (HDI), heptamethylene diisocyanate, octamethylene diisocyanate, decamethylene diisocyanate, dodecamethylene diisocyanate, 2,2,4- and/or 2,4,4-trimethyl hexamethylene diisocyanate, lysine diisocyanate, 2,6-diisocyanato methyl caproate, 2,6-diisocyanato ethyl caproate, bis(2-isocyanatoethyl)fumarate, and bis(2-isocyanatoethyl)carbonate]; and polyisocyanates having three or more functional groups (e.g. triisocyanate) [e.g. 1,6,11-undecane triisocyanate, 1,8-diisocyanate-4-isocyanatemethyloctane, 1,3,6-hexamethylene triisocyanate, and lysine ester triisocyanate (a phosgene compound that is a reaction product of lysine and an alkanol amine), 2-isocyanatoethyl-2,6-diisocyanatohexanoate, 2- and/or 3-isocyanatopropyl-2,6-diisocyanatohexanoate].

Examples of the alicyclic polyisocyanates include $C_{4-15}$ alicyclic polyisocyanates, such as diisocyanates [isophorone diisocyanate (IPDI), dicyclohexylmethane-4,4'-diisocyanate (hydrogenated MDI), cyclohexylene diisocyanate, methylcyclohexylene diisocyanate, bis(2-isocyanatoethyl)-4-cyclohexylene-1,2-dicarboxylate, and 2,5- and/or 2,6-norbornane diisocyanate]; and polyisocyanates having three or more functional groups (e.g. triisocyanate) [e.g. bicycloheptane triisocyanate].

Examples of the aromatic-aliphatic polyisocyanates include $C_{8-15}$ aromatic-aliphatic polyisocyanates, such as m- and/or p-xylylene diisocyanate (XDI), diethylbenzene diisocyanate, and α,α,α',α'-tetramethylxylylene diisocyanate (TMXDI).

Examples of the modified products of these polyisocyanates include modified products containing at least one group such as a carbodiimide, urethane, urea, isocyanurate, urethoimine, allophanate, biuret, oxazolidone, or urethodione group, such as urethane-modified products (e.g. NCO-terminated urethane prepolymers obtained by reacting the mentioned polyetherpolyol or the like with an excessive amount of a polyisocyanate), biuret-modified products, isocyanurate-modified products, and trihydrocarbyl phosphate-modified products of polyisocyanates such as MDI, TDI, HDI, and IPDI, and mixtures of these.

Preferred among these are $C_{6-63}$ aromatic polyisocyanates, and particularly preferred are crude MDIs ($C_{15-63}$ polymethylene polyphenyl polyisocyanates), in terms of expansion due to moisture absorption.

The proportion between the polyol component (A) and the isocyanate component (B) may be variously changed. The isocyanate index [(equivalent ratio of NCO group/active hydrogen-containing group)×100] is preferably 80 to 140, more preferably 85 to 120, and particularly preferably 90 to 115, in terms of the strength of resin. The weight ratio of the polyol component (A) to the isocyanate component (B) is preferably 50:50 to 80:20.

Inorganic Filler (C) and Dehydrating Agent (D)

The rigid polyurethane resin-forming composition (P) for cutting of the present invention includes the following inorganic filler (C) and a dehydrating agent (D). The amount of the (C) is preferably 0.1 to 50% by weight, more preferably 1 to 40% by weight, and still more preferably 5 to 35% by weight, and the amount of the (D) is preferably 0.1 to 15% by weight, more preferably 0.5 to 10% by weight, and still more preferably 1 to 8% by weight, for a total of 100% by weight of the polyol component (A) and the isocyanate component (B), in terms of moldability.

The inorganic filler (C) is powder and the particle size thereof is not particularly limited. Examples of the (C) include talc, mica, kaolin, aluminum hydroxide, magnesium hydroxide, calcium carbonate, and plaster. Preferred among these is talc in terms of ease in cutting.

The dehydrating agent (D) may be a known compound having a dehydrating effect, and is preferably a neutral or alkaline dehydrating agent having a volume average particle size of 0.1 to 50 μm.

Examples of such a dehydrating agent include calcium oxide, calcium sulfate (hemihydrate plaster), calcium chloride, and molecular sieves. Preferred among these are calcium sulfate (hemihydrate plaster) and molecular sieves, and particularly preferred are molecular sieves.

The rigid polyurethane resin-forming composition (P) for cutting of the present invention may include microballoons (E) for improving the ease in cutting of the rigid polyurethane resin (Q) for cutting that is obtainable by a reaction of the (P). The amount of the (E) is usually not more than 15% by weight, preferably 0.1 to 15% by weight, more preferably 0.1 to 10% by weight, and still more preferably 1 to 8% by weight, for a total of 100% by weight of the polyol component (A) and the isocyanate component (B), in terms of ease in cutting.

Examples of the microballoons (E) include microballoons formed of a thermoplastic resin (e.g. polyvinylidene chloride, polymethyl methacrylate, polyacrylonitrile), microballoons formed of a thermosetting resin (e.g. phenolic resin, epoxy resin, urea resin), and microballoons formed of inorganic materials (e.g. glass, alumina, shirasu, carbon). The microballoons (E) have a volume average particle size of preferably 10 to 200 μm and a bulk specific gravity of preferably 0.01 to 0.5. Specific examples of such microballoons available in the market include Matsumoto Microspheres F-80ED and MFL series (Matsumoto Yushi-Seiyaku Co., Ltd.), Phenolic Microballoons BJO-0930 (Union Carbide Corporation), and Scotchlite K-15 and K-37 (Scotchlite).

The rigid polyurethane resin-forming composition (P) for cutting of the present invention may further include additives (G) for improving the moldability and other functions of the resulting molded article. The total amount of the additives (G) is usually not more than 10% by weight, and preferably 0.5 to 8% by weight, for a total of 100% by weight of the (A) and (B).

Examples of additives (G) include lubricants (e.g. calcium stearate, ethylenediamine stearylamide), catalysts [e.g. amine catalysts such as triethylenediamine, metal catalysts such as dibutyltin dilaurate and tris(2-ethylhexanoate)bismuth], colorants (e.g. metal oxides, disazo pigment), antioxidants (e.g. nickel dibutyldithiocarbamate, hindered phenol), plasticizers (e.g. dibutyl phthalate, di (2-ethylhexyl) adipate), fire retardants (e.g. salts of melamine and cyanuric or isocyanuric acid), antistatic agents [e.g. anion surfactants [phosphoric acid ester salts (e.g. monophosphate ester salts of polyoxyalkylene compounds, diphosphate ester salts of polyoxyalkylene compounds), alkylbenzene sulfonate], cation surfactants, and non-ionic surfactants]. One or more of these may be used.

The rigid polyurethane resin (Q) for cutting of the present invention is obtainable by a reaction of the rigid polyurethane resin-forming composition (P) for cutting.

Examples of the method for reacting the polyol component (A) with the isocyanate component (B) in the (P) are:

(1) a one-shot method of mixing the (A) and (B) at once to react, and (2) a prepolymer method of previously reacting part of the (A) with the (B) to form an NCO-terminated prepolymer and then reacting the NCO-terminated prepolymer with the rest of the (A), or previously reacting the (A) with part of the (B) to form an OH-terminated prepolymer and then reacting the OH-terminated prepolymer with the rest of the (B).

Examples of the molded article (R) of the rigid polyurethane resin for cutting, which is formed of the rigid polyurethane resin (Q) for cutting, include molded articles without microbubbles, lightweight syntactic foams with microbubbles formed by only microballoons, lightweight foams with microbubbles of an inert gas generated by the following mechanical froth method, and foams with both microbubbles formed by microballoons and microbubbles of an inert gas generated by the mechanical froth method.

Molded articles without microbubbles have high densities of not smaller than about 1.2 g/cm$^3$ and are used for materials for models required to have a great strength. Usually, molded articles are used for materials for models in the state of syntactic foam or foam, which are lightweight and have good ease in cutting.

Examples of the foaming method include a foaming agent-using foaming method of adding a volatile foaming agent such as a fluorocarbon, a hydrogen-containing halogenated hydrocarbon, or a low-boiling-point hydrocarbon, or water which serves as a generation source of carbon dioxide during and/or before mixing the polyol component and the aromatic polyisocyanate component; and a mechanical froth foaming method of blowing air or an inert gas such as nitrogen into the mixture during mixing. The mechanical froth foaming method is suitable for forming rigid polyurethane resin molded articles having dense surfaces required for the materials for models.

The mechanical froth foaming method is illustrated in FIG. 3 of JP 3083751 B. The method uses a mechanical froth foaming machine composed of a cylinder-shaped stator that has a large number of teeth inside and a rotor that is placed in the stator and also has a large number of teeth. While the rotor is rotated, a material to be foamed and an inert gas are simultaneously and continuously injected into the foaming machine, whereby a foamed material is continuously collected from the outlet of the forming machine.

Since the foaming machine may have a desired number of inlets for materials and inert gases, two or more materials and inert gases may be mixed. The materials may have curability if they are cured after ejected from the foaming machine.

The mixture of the material (s) and inert gas (es) ejected from the outlet is poured into a mold (e.g. open mold, sealed mold) the temperature of which is adjusted to 25 to 120° C. in advance, or onto a belt conveyor with sidewalls for preventing the mixture from spilling out.

The mixture is cured in a curing furnace preferably at 70 to 130° C., and more preferably at 80 to 120° C., for 0.5 to 10 hours to provide molded articles.

The mold and the belt conveyor are usually made of metal (e.g. aluminum, stainless steel) or plastic (e.g. polypropylene, polycarbonate).

For preparing materials for models, the mechanical froth foaming method is preferred to the foaming agent-using foaming method in the points where the bubble size after foaming is fine and minute and where the density distribution of the resulting cured material is uniform.

The bubble size of microbubbles formed by the mechanical froth foaming method is preferably 0.5 to 300 μm, and more preferably 1 to 200 μm.

A microbubble size of not smaller than 0.5 μm allows stable microbubbles, and a microbubble size of not greater than 300 μm allows fine texture of the resulting resin molded article, thereby allowing a simplified coating step if the article needs cutting.

The amount (vol %) of microbubbles formed by the mechanical froth foaming method refers to the percentage of the volume of inert gas(es) if the molded article includes no microballoons, or the sum of the volume of microballoons and the volume of inert gas(es) if the molded article includes microballoons, relative to the volume of the molded article. The amount thereof is preferably 10 to 95, more preferably 15 to 90, and still more preferably 20 to 85. Such ranges allow production of uniformly dispersed fine bubbles.

In the mechanical froth foaming method, the rigid polyurethane resin-forming composition (P) for cutting may include a foam stabilizer (F) for stabilizing the bubble size of rigid polyurethane foam resin. The amount of the (F) is usually not more than 10% by weight, preferably 0.1 to 8% by weight, and still more preferably 0.5 to 5% by weight, for a total of 100% by weight of the (A) and (B) in terms of stability of bubbles.

Examples of the foam stabilizer (F) include silicon foam stabilizers (e.g. dimethyl polysiloxane; non-reactive dimethylsiloxane in which at least one of the main chain, side chain, and terminal is modified with polyoxyalkylene, phenyl, alkyl, aralkyl, or the like).

The rigid polyurethane resin molded article (R) of the present invention requires a long-term measurement for determining the moisture expansion coefficient. The moisture expansion coefficient is thus determined by an accelerated method of determining a saturated water absorption expansion coefficient. This is because a saturated water absorption expansion coefficient, which is determined by immersing the molded article in water and then measuring the expansion value of the molded article, corresponds to the saturated moisture expansion coefficient at the same temperature and at 95% RH.

The method for determining the saturated water absorption expansion coefficient is as follows.

A 20×20×100 mm specimen is cut out from the rigid polyurethane resin molded article. The specimen is placed in an aluminum laminated bag. The bag is sealed and stored at 25° C. for 24 hours. The specimen is then taken out of the bag and the length of the specimen in the 100-mm direction is measured with a vernier caliper. The measured length is defined as the length before immersion. The specimen is immersed in purified water in a sealable container. The container is sealed and stored in a thermostatic chamber at 25° C. The length of the specimen is repeatedly measured with the vernier caliper at regular time intervals, and the measured lengths are defined as the lengths after immersion.

The water absorption expansion coefficients in purified water are calculated with the mathematical formula (1).

[Math. 1]

$$\text{Water absorption expansion coefficient (\%)} = \frac{\text{Length after immersion (mm)} - \text{Length before immersion (mm)}}{\text{Length before immersion (mm)}} \times 100 \quad (1)$$

Among the obtained water absorption expansion coefficients, the coefficients at which the increase from the previous measurement is not more than 0.01% is defined as the saturated water absorption expansion coefficient.

The saturated water absorption expansion coefficient is preferably not more than 0.3% in terms of distortion and warping of the resulting model or inspection jig material.

The molded article (R) of the rigid polyurethane resin for cutting can be cut into models, master models, or inspection jigs.

If the molded article (R) of the rigid polyurethane resin for cutting of the present invention needs cutting, the molded article is exposed to cutting (machining) using a computerized machine tool called NC machine, such as a NC milling machine or a machining center, as shown in "Mokei sakusei gijutsu mannual (mannuals of model producing technique)" (published by SOKEIZAI Center). Alternatively, the molded article is exposed to cutting (hand processing) using a saw, chisel, or plane and then the finishing surface is smoothed with a sandpaper to produce a model.

Examples of the edged tool used in machining include ball end mills and flat end mills. Such tools are usually made of a material such as high-speed steel or cemented carbide.

Machining mainly consists of 3 cutting steps: an initial step of crude processing, a middle step of middle processing, and a final step of finish processing. Preferably, in crude processing, the rigid polyurethane resin of the present invention is exposed to cutting with a 20- to 30-mm diameter edged tool at an edged tool feeding speed of 1,000 to 3,000 mm/min and an edged tool rotation speed of 200 to 5,000 rpm. Preferably, in the next middle processing, the resin is exposed to cutting with a 10- to 20-mm diameter edged tool at a feeding speed of 1,000 to 2,000 mm/min and a rotation speed of 1,000 to 3,000 rpm. Preferably, in the finish processing, the resin is exposed to cutting with a 5- to 10-mm diameter edged tool at a feeding speed of 500 to 1,500 mm/min and a rotation speed of 1,000 to 2,000 rpm.

If the obtained models are used for design models of articles such as automobiles, the models are finished with further coating to be provided for evaluation of design. If the obtained models are used for master models that serve as a pattern for metal patterns for molding or the like, the models are used to form inverted molds with materials such as foundry sand, resin, and plaster.

EXAMPLES

In the following, the present invention is described in detail referring to examples, which are not intended to limit the present invention. The terms "part (s)" and "%" in the examples refer to part (s) by weight and % by weight, respectively.

The material compositions and symbols used in Tables 1 to 3 for the examples and comparative examples are listed below.

Polyol Component (A)
Polyphenol (j) AO Adduct (a)

Polyphenol (j) AO adduct (a-1) BPA PO (not more than 2 mol) adduct (29%), BPA PO (not less than 3 mol) adduct (71%) [hydroxyl value: 280 mg KOH/g]

Polyphenol (j) AO adduct (a-2): BPA PO (not more than 2 mol) adduct (36%), BPA PO (not less than 3 mol) adduct (64%) [hydroxyl value: 288 mg KOH/g]

Polyphenol (j) AO adduct (a-3): BPA PO (not less than 3 mol) adduct (not including BPA PO (not more than 2 mol) adduct) [hydroxyl value: 112 mg KOH/g]

Polyphenol (j) AO adduct (a-4): BPA PO (not more than 2 mol) adduct (4%), BPA PO (not less than 3 mol) adduct (96%) [hydroxyl value: 216 mg KOH/g]

Polyphenol (j) AO adduct (a-1'): BPA PO (not more than 2 mol) adduct (49%), BPA PO (not less than 3 mol) adduct (51%) [hydroxyl value: 300 mg KOH/g]

Polyphenol (j) AO adduct (a-2'): BPA PO (not less than 3 mol) adduct (not including BPA PO (not more than 2 mol) adduct) [hydroxyl value: 56 mg KOH/g]

Polyphenol (j) AO adduct (a-3'): BPA PO (not more than 2 mol) adduct (93%), BPA PO (not less than 3 mol) adduct (7%) [hydroxyl value: 316 mg KOH/g]

Polyol (b)

Polyol (b-1): glycerin PO (5.7 mol) adduct [hydroxyl value: 400 mg KOH/g]

Polyol (b-2): glycerin PO (2.7 mol) adduct [hydroxyl value: 673 mg KOH/g]

Polyol (b-3): glycerin PO (15.7 mol) adduct [hydroxyl value: 168 mg KOH/g]

Polyol (b-4): pentaerythritol PO (7.3 mol) adduct [hydroxyl value: 400 mg KOH/g]

Polyol (b-1'): glycerin PO (24.3 mol) adduct [hydroxyl value: 112 mg KOH/g]

Polyol (b-2'): tolylene diamine PO (5.6 mol) EO (2.6 mol) adduct [hydroxyl value: 400 mg KOH/g]

Polyol (b-3'): glycerin PO (2.3 mol) adduct [hydroxyl value: 750 mg KOH/g]

<Hydroxyl Value Measurement Method>

The measurement was carried out in conformity with JIS K1557-1 (2007).

<Method for Determining the Amount of BPA PO (not More than 2 mol) Adduct>

The amount of BPA PO (not more than 2 mol) adduct was determined by high-performance liquid chromatograph.

Measuring conditions were as follows.

High-performance liquid chromatograph: Prominence UFLC

Column: Shim-pack XR-ODS [Shimadzu Corporation]
Mobile phase: water/methanol
Temperature: 40° C.

Isocyanate Component (B)

Crude MDI (B-1): trade name "Millionate MR-200", Nippon Polyurethane Industry Co., Ltd., (NCO %: 31.3)

Carbodiimide-modified M diisocyanate (B-2): trade name "Coronate MTL", Nippon Polyurethane Industry Co., Ltd., (NCO %: 28.8)

Inorganic Filler (C)

Inorganic filler (C-1): trade name "SOAP STONE C", Imerys Specialities Japan Co., Ltd., talc Dehydrating Agent (D)

Dehydrating agent (D-1): trade name "Molecular Sieve 3A-B powder", UNION SHOWA K.K., molecular sieve Microballoons (E)

Microballoons (E-1): trade name "Matsumoto Microsphere MFL-80GCA", Matsumoto Yushi-Seiyaku Co., Ltd., acrylic microballoons having an average particle size of 20 μm and a density of 0.24 g/cm$^3$ Other Components Foam stabilizer (F-1): trade name "SZ-1671", Dow Corning Toray Co., Ltd., silicone foam stabilizer Catalyst (G-1): trade name "Stann BL", DAIICHI SANKYO CHEMICAL PHARMA CO., LTD., di-n-butyltin dilaurate Examples 1 to 6

Rigid Polyurethane Resin Molded Articles for Cutting

The main agent components according to the composition in Table 1 were placed in a planetary mixer, stirred at 130 rpm for 10 min, and then stirred and degassed at not higher than 4 kPa for 5 min to produce a mixture of the main agent components. The curing agent components were stirred and degassed in the same manner to produce a mixture of the curing agent components. The temperature of each mixture was controlled to 25±1° C. The mixture of the main agent components and the mixture of the curing agent components were then placed in the planetary mixer and stirred and degassed at 130 rpm and not higher than 4 kPa for 1 min. The resulting mixture was injected into a 50×50×150-mm mold to produce a rigid polyurethane resin molded article for cutting.

Comparative Examples 1 to 6

Using the components according to the composition in Table 2, rigid polyurethane resin molded articles for cutting for comparison were produced in the same manner as in Examples 1 to 6.

The rigid polyurethane resin molded articles for cutting obtained in Examples 1 to 6 and Comparative Examples 1 to 6 were evaluated for scorching, temperature of deflection under load, and water absorption expansion coefficient. Tables 1 and 2 show the results.

TABLE 1

|  | Examples | | | | | |
|---|---|---|---|---|---|---|
|  | 1 | 2 | 3 | 4 | 5 | 6 |
| Main agent | | | | | | |
| Polyol component (A) | | | | | | |
| AO addcut (a) | | | | | | |
| AO addcut (a-1) | 80 | 99 |  | 60 |  |  |
| AO addcut (a-2) |  |  | 80 |  |  |  |
| AO addcut (a-3) |  |  |  |  |  | 50 |

TABLE 1-continued

|  | Examples | | | | | |
| --- | --- | --- | --- | --- | --- | --- |
|  | 1 | 2 | 3 | 4 | 5 | 6 |
| AO addcut (a-4) |  |  |  |  |  | 80 |
| AO addcut (a-1') |  |  |  |  |  |  |
| AO addcut (a-2') |  |  |  |  |  |  |
| AO addcut (a-3') |  |  |  |  |  |  |
| PO (not more than 2 mol) adduct content (%) | 29 | 29 | 36 | 29 | 0 | 4 |
| Hydroxyl value (mgKOH/g) | 280 | 280 | 288 | 280 | 112 | 216 |
| Polyol (b) |  |  |  |  |  |  |
| Polyol (b-1) | 20 |  |  | 20 |  | 20 |
| Polyol (b-2) |  | 1 |  |  |  |  |
| Polyol (b-3) |  |  | 20 |  |  |  |
| Polyol (b-4) |  |  |  | 20 | 50 |  |
| Polyol (b-1') |  |  |  |  |  |  |
| Polyol (b-2') |  |  |  |  |  |  |
| Polyol (b-3') |  |  |  |  |  |  |
| Hydroxyl value (mgKOH/g) | 400 | 673 | 168 | 400 | 400 | 400 |
| EO content of polyol component (A) (%) | 0 | 0 | 0 | 0 | 0 | 0 |
| Inorganic filler (C-1) | 5 | 1 | 5 | 5 | 40 | 5 |
| Dehydrating agent (D-1) | 2 | 2 | 2 | 2 | 10 | 5 |
| Other components |  |  |  |  |  |  |
| Microballoons (E-1) |  |  |  |  |  | 2.5 |
| Catalyst (G-1) | 0.01 | 0.01 | 0.01 | 0.01 | 0.01 | 0.01 |
| Curing agent |  |  |  |  |  |  |
| Isocyanate component (B) |  |  |  |  |  |  |
| Crude MDI (B-1) | 75.6 | 70.6 | 71.4 | 81.6 | 63.7 | 62.9 |
| Carbodiimide-modified MDI (B-2) |  |  |  |  |  |  |
| Isocyanate index | 104 | 104 | 104 | 104 | 104 | 104 |
| Inorganic filler (C-1) | 5 | 1 | 5 | 5 | 40 | 5 |
| Other components |  |  |  |  |  |  |
| Microballoons (E-1) |  |  |  |  |  | 2.5 |
| Evaluation results |  |  |  |  |  |  |
| Density of cured material (g/cm$^3$) | 1.18 | 1.17 | 1.19 | 1.18 | 1.33 | 1.09 |
| Scorching | None | None | None | None | None | None |
| Temperature of deflection under load (° C.) | 110 | 120 | 99 | 105 | 80 | 92 |
| Saturated water absorption expansion coefficient (%) | 0.22 | 0.14 | 0.13 | 0.21 | 0.28 | 0.19 |

TABLE 2

|  | Comparative Examples | | | | | |
| --- | --- | --- | --- | --- | --- | --- |
|  | 1 | 2 | 3 | 4 | 5 | 6 |
| Main agent |  |  |  |  |  |  |
| Polyol component (A) |  |  |  |  |  |  |
| AO addcut (a) |  |  |  |  |  |  |
| AO addcut (a-1) |  |  | 80 | 30 |  | 80 |
| AO addcut (a-2) |  |  |  |  |  |  |
| AO addcut (a-3) |  |  |  |  |  |  |
| AO addcut (a-4) |  |  |  |  |  |  |
| AO addcut (a-1') | 80 |  |  |  |  |  |
| AO addcut (a-2') |  | 80 |  |  |  |  |
| AO addcut (a-3') |  |  |  |  | 50 |  |
| PO (not more than 2 mol) adduct content (%) | 49 | 0 | 29 | 29 | 93 | 29 |
| Hydroxyl value (mgKOH/g) | 300 | 56 | 280 | 280 | 316 | 280 |
| Polyol (b) |  |  |  |  |  |  |
| Polyol (b-1) | 20 | 20 |  | 70 |  |  |
| Polyol (b-2) |  |  |  |  |  |  |
| Polyol (b-3) |  |  |  |  |  |  |
| Polyol (b-4) |  |  |  |  |  |  |
| Polyol (b-1') |  |  | 20 |  |  |  |
| Polyol (b-2') |  |  |  |  | 50 |  |
| Polyol (b-3') |  |  |  |  |  | 20 |

TABLE 2-continued

|  | Comparative Examples | | | | | |
|---|---|---|---|---|---|---|
|  | 1 | 2 | 3 | 4 | 5 | 6 |
| Hydroxyl value (mgKOH/g) | 400 | 400 | 112 | 400 | 400 | 750 |
| EO content of polyol component (A) (%) | 0 | 0 | 0 | 0 | 10.2 | 0 |
| Inorganic filler (C-1) | 5 | 5 | 5 | 5 |  | 5 |
| Dehydrating agent (D-1) | 2 | 2 | 2 | 2 | 2 | 2 |
| Other components |  |  |  |  |  |  |
| Microballoons (E-1) |  |  |  |  |  |  |
| Catalyst (G-1) | 0.01 | 0.01 | 0.01 | 0.01 | 0.01 | 0.01 |
| Curing agent |  |  |  |  |  |  |
| Isocyanate component (B) |  |  |  |  |  |  |
| Crude MDI (B-1) | 79.6 | 31.0 | 61.3 | 90.5 |  | 93.0 |
| Carbodiimide-modified MDI (B-2) |  |  |  |  | 112 |  |
| Isocyanate index | 104 | 104 | 104 | 104 | 120 | 104 |
| Inorganic filler (C-1) | 5 | 5 | 5 | 5 |  | 5 |
| Other components |  |  |  |  |  |  |
| Microballoons (E-1) |  |  |  |  |  |  |
| Evaluation results |  |  |  |  |  |  |
| Density of cured material (g/cm$^3$) | 1.17 | 1.19 | 1.19 | 1.18 | 1.18 | 1.18 |
| Scorching | Present | None | None | None | Present | Present |
| Temperature of deflection under load (° C.) | 110 | 35 | 55 | 78 | 110 | 120 |
| Saturrated water absorption expansion coefficient (%) | 0.25 | 0.80 | 0.45 | 0.42 | 0.23 | 0.22 |

Examples 7 to 9

Rigid Foamed Polyurethane Resin Molded Articles for Cutting

The main agent components according to the composition in Table 3 were placed in a planetary mixer, stirred at 130 rpm for 10 min, and then stirred and degassed at not higher than 4 kPa for 5 min to produce a mixture of the main agent components. The curing agent components were stirred and degassed in the same manner to produce a mixture of the curing agent components. The temperature of each mixture was controlled to 25±1° C. Then, while the rotor of a mechanical froth machine (TOHO MACHINERY IND. CO., LTD., MF-350 type mechanical froth machine) was rotated at 300 rpm and nitrogen gas was blown into the machine, the mixture of the main agent components and the mixture of the curing agent components were continuously supplied from the inlet of a mixing head at a flow rate of the mixtures of a total of 3 L/min. The mixed liquid ejected from the outlet of the mixing head was injected into a 50×50× 150-mm mold through a 1-m vinyl hose to produce a rigid polyurethane foam resin molded article for cutting.

Comparative Examples 7 and 8

Using the components according to the composition in Table 3, rigid polyurethane foam resin molded articles for cutting for comparison were produced in the same manner as in Examples 7 to 9.

TABLE 3

|  | Examples | | | Comparative Examples | |
|---|---|---|---|---|---|
|  | 7 | 8 | 9 | 7 | 8 |
| Main agent |  |  |  |  |  |
| Polyol component (A) |  |  |  |  |  |
| AO addcut (a) |  |  |  |  |  |
| AO addcut (a-1) | 80 | 80 |  |  | 80 |
| AO addcut (a-4) |  |  | 80 |  |  |
| AO addcut (a-1') |  |  |  | 80 |  |
| PO (not more than 2 mol) adduct content (%) | 29 | 29 | 4 | 49 | 29 |
| Hydroxyl value (mgKOH/g) | 280 | 280 | 216 | 300 | 280 |
| Polyol (b) |  |  |  |  |  |
| Polyol (b-1) | 20 | 20 | 20 | 20 |  |
| Polyol (b-1') |  |  |  |  | 20 |
| Hydroxyl value (mgKOH/g) | 400 | 400 | 400 | 400 | 112 |
| EO content of polyol component (A) (%) | 0 | 0 | 0 | 0 | 0 |
| Inorganic filler (C-1) | 10 | 5 | 5 | 5 | 5 |
| Dehydrating agent (D-1) | 2 | 2 | 2 | 2 | 2 |

TABLE 3-continued

|  | Examples | | | Comparative Examples | |
|---|---|---|---|---|---|
|  | 7 | 8 | 9 | 7 | 8 |
| Other components |  |  |  |  |  |
| Microballoons (E-1) |  | 5 | 5 |  |  |
| Foam stabilizer (F-1) | 4 | 4 | 4 | 4 | 4 |
| Catalyst (G-1) | 0.01 | 0.01 | 0.01 | 0.01 | 0.01 |
| Curing agent |  |  |  |  |  |
| Isocyanate component (B) |  |  |  |  |  |
| Crude MDI (B-1) | 75.6 | 75.6 | 62.9 | 79.6 | 61.3 |
| Isocyanate index | 104 | 104 | 104 | 104 | 104 |
| Inorganic filler (C-1) | 10 | 5 | 5 | 5 | 5 |
| Other components |  |  |  |  |  |
| Microballoons (E-1) |  | 5 | 5 |  |  |
| Evaluation results |  |  |  |  |  |
| Density of cured material (g/cm³) | 0.75 | 0.08 | 0.40 | 0.80 | 0.70 |
| Scorching | None | None | None | Present | None |
| Temperature of deflection under load (° C.) | 110 | 75 | 80 | 112 | 50 |
| Saturrated water absorption expansion coefficient (%) | 0.20 | 0.18 | 0.15 | 0.24 | 0.46 |

<Density of Cured Material>

A 20×20×100 mm specimen was cut out from the obtained rigid polyurethane resin molded article and the density was calculated from the weight and the volume.

<Scorching>

The obtained rigid polyurethane resin molded article was cut in half and the color of the cut surface was observed. The cut surface having no change was evaluated as having no scorching (referred to as "None" in Tables), and the cut surface having color change to brown in the center part was evaluated as having scorching (referred to as "Present" in Tables).

<Temperature of Deflection Under Load>

The rigid polyurethane resin molded article was tested in conformity with JIS K 6911 (2006).

<Water Absorption Expansion Coefficient>

Since the saturated water absorption expansion coefficient, which is determined by immersing a molded article in water and then measuring the expansion value, corresponds to the saturated moisture expansion coefficient at the same temperature and at 95% RH, the moisture expansion coefficient was determined by an accelerated method of determining a saturated water absorption expansion coefficient. The method for determination is as follows.

A 20×20×100-mm specimen was cut out from the rigid polyurethane resin molded article and placed in an aluminum laminated bag. The bag was sealed and stored at 25° C. for 24 hours. The specimen was then taken out of the bag and the length of the specimen in the 100-mm direction was measured with a vernier caliper. The measured length was defined as the length before immersion. The specimen was immersed in purified water in a sealable container. The container was sealed and stored in a thermostatic chamber at 25° C. The length of the specimen was repeatedly measured with the vernier caliper at regular time intervals, and the measured lengths were defined as the lengths after immersion. The ratio at which the increase from the previous measurement was not more than 0.01% was defined as the saturated water absorption expansion coefficient.

The water absorption expansion coefficient in purified water was calculated with the mathematical formula (1).

[Math. 2]

$$\text{Water absorption expansion coefficient (\%)} = \frac{\text{Length after immersion (mm)} - \text{Length before immersion (mm)}}{\text{Length before immersion (mm)}} \times 100 \quad (1)$$

As shown in Tables 1 and 2, the resin molded articles obtained from the rigid polyurethane resin-forming compositions (P) of Examples 1 to 6 each had a high temperature of deflection under load, no scorching, and a small water absorption expansion coefficient. In contrast, the resin molded articles of Comparative Examples 1, 5, and 6 had scorching; the resin molded articles of Comparative Examples 2 and 3 each had a low temperature of deflection under load and a large water absorption expansion coefficient; and the resin molded article of Comparative Example 4 had a large water absorption expansion coefficient. Thus, no resin molded articles of the comparative examples succeeded in achieving all of the following three properties as in the examples: high temperature of deflection under load, no scorching, and small water absorption expansion coefficient.

As shown in Table 3, the foamed resin molded articles obtained from the rigid polyurethane resin-forming compositions (P) of Examples 7 to 9 each had a high temperature of deflection under load, no scorching, and a small water absorption expansion coefficient. In contrast, the foamed resin molded article of Comparative Example 7 had scorching, and the foamed resin molded article of Comparative Example 8 had a low temperature of deflection under load and a large water absorption expansion coefficient. Thus, no foamed resin molded articles of the comparative examples succeeded in achieving all of the following three properties as in the examples: high temperature of deflection under load, no scorching, and small water absorption expansion coefficient.

INDUSTRIAL APPLICABILITY

The rigid polyurethane resin molded article for cutting of the present invention can be widely used for models such as design models and master models, simple injection molds, and cutting materials such as inspection jigs, and thus is quite useful.

The invention claimed is:

1. A rigid polyurethane resin-forming composition (P) for cutting, comprising:
   a polyol component (A);
   an isocyanate component (B);
   an inorganic filler (C); and
   a dehydrating agent (D),
   the polyol component (A) comprising:
      55 to 99% by weight of a bisphenol A alkylene oxide adduct composition (a), and
      1 to 45% by weight of a polyol (b),
   wherein the bisphenol A alkylene oxide adduct composition (a) comprises a total of not more than 39% by weight of a bisphenol A alkylene oxide adduct (ak) prepared with at most 2 moles of alkylene oxide, based on 100% by weight of the bisphenol A alkylene oxide adduct composition (a), and a total of more than 61% by weight of a bisphenol A alkylene oxide adduct (ak') prepared with more than 2 moles of alkylene oxide, based on 100% by weight of the bisphenol A alkylene oxide adduct composition (a),
   wherein the bisphenol A alkylene oxide adduct composition (a) has a hydroxyl value of 100 to 295 mg KOH/g,
   wherein the polyol (b) is a multi-functional aliphatic or alicyclic polyol having 3 to 8 functional groups, and has a hydroxyl value of 160 to 700 mg KOH/g, and
   wherein the weight of oxyethylene groups included in the polyol component (A) is not more than 10% by weight in 100% by weight of the polyol component (A).

2. The composition (P) according to claim 1,
   wherein each of the bisphenol A alkylene oxide adduct (ak) and the bisphenol A alkylene oxide adduct (ak') is a bisphenol A propylene oxide adduct.

3. The composition (P) according to claim 1,
   wherein the polyol (b) is a propylene oxide adduct of a multi-functional aliphatic or alicyclic polyol having 3 to 8 functional groups.

4. The composition (P) according to claim 1,
   wherein the isocyanate component (B) is a $C_{15-63}$ polymethylene polyphenylene polyisocyanate.

5. The composition (P) according to claim 1,
   wherein the inorganic filler (C) is talc.

6. The composition (P) according to claim 1, further comprising microballoons (E), wherein the amount of the microballoons (E) is not more than 15% by weight for a total of 100% by weight of the polyol component (A) and the isocyanate component (B).

7. A rigid polyurethane resin (Q) for cutting, obtainable by a reaction of the rigid polyurethane resin-forming composition (P) for cutting according to claim 1.

8. The polyurethane resin (Q) according to claim 7,
   wherein the polyurethane resin (Q) is a foam.

9. A molded article (R) of the rigid polyurethane resin for cutting, comprising the rigid polyurethane resin (Q) for cutting according to claim 7.

10. A model obtainable by cutting the molded article (R) of the rigid polyurethane resin for cutting according to claim 9.

11. A master model obtainable by cutting the molded article (R) of the rigid polyurethane resin for cutting according to claim 9, wherein the master model serves as a pattern for metal patterns for molding.

12. An inspection jig obtainable by cutting the molded article (R) of the rigid polyurethane resin for cutting according to claim 9.

13. A method for producing a rigid polyurethane resin for cutting, comprising
   mechanical frothing while reacting the rigid polyurethane resin-forming composition (P) for cutting according to claim 1 to produce a rigid polyurethane resin (Q) for cutting.

14. The method according to claim 13,
   wherein the rigid polyurethane resin-forming composition (P) for cutting further comprises a foam stabilizer (F).

* * * * *